United States Patent [19]

Alexander

[11] Patent Number: 4,620,746
[45] Date of Patent: Nov. 4, 1986

[54] FOLD DOWN WINDOW LATCH APPARATUS

[75] Inventor: Michael P. Alexander, Grosse Ile, Mich.

[73] Assignee: ASC Incorporated, Southgate, Mich.

[21] Appl. No.: 699,785

[22] Filed: Feb. 8, 1985

[51] Int. Cl.⁴ .............................................. B60J 1/18
[52] U.S. Cl. ................................. 296/201; 296/146; 49/394
[58] Field of Search .................... 296/146, 201, 224; 49/381, 394, 34

[56] References Cited

U.S. PATENT DOCUMENTS

| 2,762,648 | 9/1956 | Huggard | 296/146 |
| 3,462,189 | 8/1969 | Kavihekar | 296/146 |
| 3,521,403 | 7/1970 | Bouwkamp | 296/146 |

FOREIGN PATENT DOCUMENTS 1146767 4/1963 Fed. Rep. of Germany ...... 296/146

Primary Examiner—Robert R. Song
Attorney, Agent, or Firm—Basile Weintraub Hanlon

[57] ABSTRACT

A latch apparatus for a fold-down rear vehicle window releasably holds the window in a folded down position opening the rear window opening of the vehicle. The latch apparatus includes a channel member mounted on the vehicle rearward of the rear window of the vehicle. A latch member in the form of a solid body having a slot for releasably engaging one edge of the rear window of the vehicle includes a base portion slidably mounted within the channel member. A biasing spring is mounted within the channel member and is connected to the body for biasing the body towards the front end of the vehicle thereby permitting movement of the body to releasably receive the rear window and to allow pivoting of the rear window when the rear window is in the latched, folded down position and the rear deck lid of the vehicle is raised or lowered.

7 Claims, 4 Drawing Figures

FOLD DOWN WINDOW LATCH APPARATUS

BACKGROUND OF THE INVENTION

1. Field of the Invention

This invention relates, in general, to vehicle windows and, more specifically, to a latch mechanism for fold down vehicle windows.

2. Description of the Prior Art

Vehicles, in particular, automobiles, are provided with several windows which are openable to allow increased ventilation. Typically, an automobile can be provided with openable side windows and side vents. The side window are prvovided of a regulator mechanism or either the manually operated type, i.e., cranked by a handle, or powered by a motor to cause the window to be selectively raised and lowered. Some windows, such as rear side windows, have also been pivotally mounted on the vehicle to enable them to be pivoted outward about one edge to a partially opened position.

It has also been known to mount the rear window or backlight for movement between raised and lowered positions. Such rear windows are mounted in vertically extending tracks such that they can may be raised or lowered by a drive mechanism for storage in the trunk of the vehicle.

However, the recent popularity of smaller sized cars has reduced the overall trunk space within the vehicle thereby reducing the amount of available space for a retractable rear window or backlight. This is particularly true on vehicles having a rear or mid-mounted engine in which case there is no space available for storing the window within the vehicle. Thus, it would be desirable to provide a mechanism which enables a rear window or backlight in a vehicle to be selectively opened, particularly in a smaller sized vehicle. It would also be desirable to provide a rear window or backlight for a vehicle which can be held in an open position during movement of the vehicle. It would also be desirable to provide a latch mechanism for a fold-down rear vehicle window which will securely hold the window in the down position during operation of the vehicle. It would also be desirable to provide a latch mechanism for a fold-down rear vehicle window which prevents interference between the window when in the down position and the rear deck lid is raised.

SUMMARY OF THE INVENTION

The present invention is a latch apparatus for a fold down rear vehicle window. The latch apparatus holds the window in a folded down position thereby permitting the rear window opening to be open during operation of the vehicle.

The latch apparatus includes a channel member having an elongated internal slot which is mounted on the vehicle rearward of the rear window. In a preferred embodiment, a recess is formed in the upper surface of the rear deck lid of the vehicle with the channel member being mounted within the recess to provide a flush appearance on the vehicle.

A latch member in the form of a solid body is slidingly mounted within the slot in the channel. The body is formed with a t-shaped base which slidably engages the slot and an upper portion which extends upward from the base. A recess or notch is formed in the upper portion of the body for releasably receiving an edge of the rear window when the window is moved to the folded down position. A biasing means is mounted within the channel and is connected to the body for biasing the body toward the front of the vehicle.

In operation, the latch member may be manually moved rearward thereby permitting the rear window to be pivoted downward about its lower edge and brought into engagement with the notch in the upper portion of the body of the latch member. This enables the window to be securely held in a down position during operation of the vehicle. More importantly, the latch member due to the biasing means and sliding nature of the latch member within the channel, prevents interference and breakage of the rear window if the rear deck lid of the vehicle is raised when the window is latched in the down position.

BRIEF DESCRIPTION OF THE DRAWING

The various features, advantages and other uses of the persent invention will become more apparent by referring to the following detailed description and drawing in which.

DESCRIPTION OF THE PREFERRED EMBODIMENTS

Figure 1:
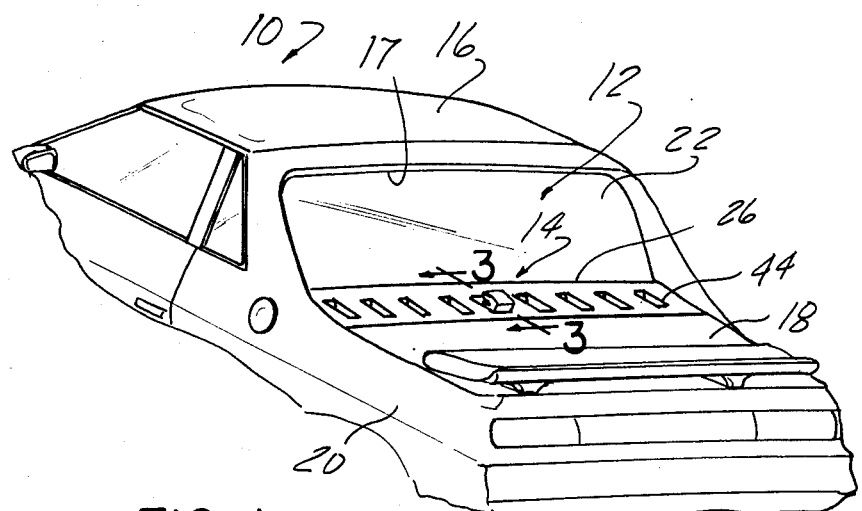
FIG. 1 is a perspective view of a vehicle having a fold down rear window and a fold down window latch appartus of the present invention mounted thereon.

Throughout the following description and drawing, an identical reference number is used to refer to the same component shown in multiple figures of the drawing.

Referring now to the drawing and to FIG. 1 in particular, there is illustrated a vehicle 10 having a fold down or pivotal rear window 12 and a latch apparatus denoted in general by reference number 14 which releasably secures the rear window 12 in the down position.

As is conventional, the vehicle 10 includes a roof 16, a rear window opening 17 and a rear deck lid 18. The rear deck lid 18 is conventionally hinged to the vehicle body 20 to permit upward movement of the rear deck lid to expose the interior of the trunk or rear mounted engine compartment.

The fold down rear window or backlight 12 is conventionally constructed of a glass panel 22 mounted in a frame, not shown. The frame is connected by a hinge 24, such as a piano-type hinge shown in FIG. 3, to permit pivotal movement of the rear window 12 about its bottom edge 26 between a raised, substantially vertical position closing the rear window opening 17 and a folded down position which opens the rear window opening 17. Suitable seals and a latch mechanism may be mounted on the rear window 12 for sealingly closing the window opening 17 and to permit the window 12 to be locked in the raised position.

As shown in FIGS. 1, 2, 3 and 4, the latch apparatus 14 includes an elongated channel member 30 is formed of any suitable material, such as metal, plastic, etc. The channel member 30 is formed with a planar base 32, integral, opposed upstanding side walls 34 and 36 and inwardly extending upper flanges 38 and 40. The inner edges of the upper flanges 38 and 40 are spaced apart to define an elongated slot 42 within the interior of the channel member 30.

Figure 2:
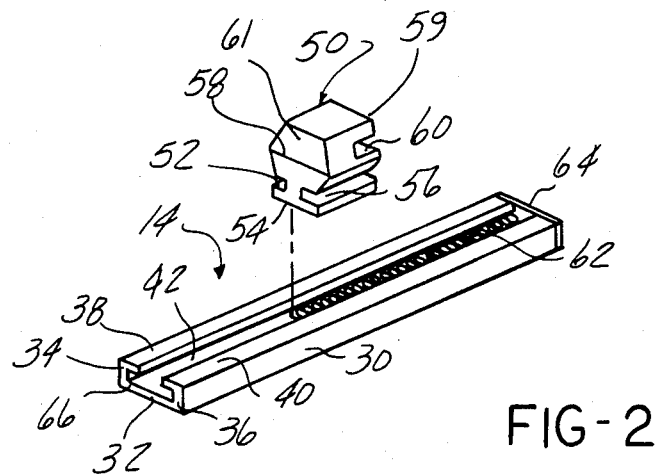
FIG. 2 is an exploded, perspective view of the latch apparatus of the present invention.

The channel member 30 is mounted on the rear deck lid 18 of the vehicle rearward of the rear window 22. In a preferred embodiment, a recess 44 is formed on the front edge of the rear deck lid 18. The channel member 30 is mounted within the recess 44 as shown in FIG. 2 in flush alignment with the top of the rear deck lid 18.

The latch apparatus 14 also includes a latch member 50 which is slidably mounted within the slot 42 in the channel member 30. The latch member 50 is in the form of a solid body having a t-shaped base or lower portion 52 comprised of a planar base 54 and an upright post 56. The upper portion 58 of the body 50 may have any desired configuration, however, as depicted in FIG. 2, the upper portion 58 of the latch member 50 preferably has a hexagonal cross-section with first and second ends 59 and 61, respectively. The first end 59 of the upper portion 58 of the latch member 50 includes a slot 60 which is sized to releasably receive the upper edge of the rear window 12 as shown in FIGS. 3 and 4.

Biasing means 62, preferably in the form of a coil spring, is mounted within the channel member 30 and is connected at one end of the channel member 30 and to the body 50 for biasing the body 50 toward the forward end 64 of the channel member 30 and the front of the vehicle 10.

Figure 3:
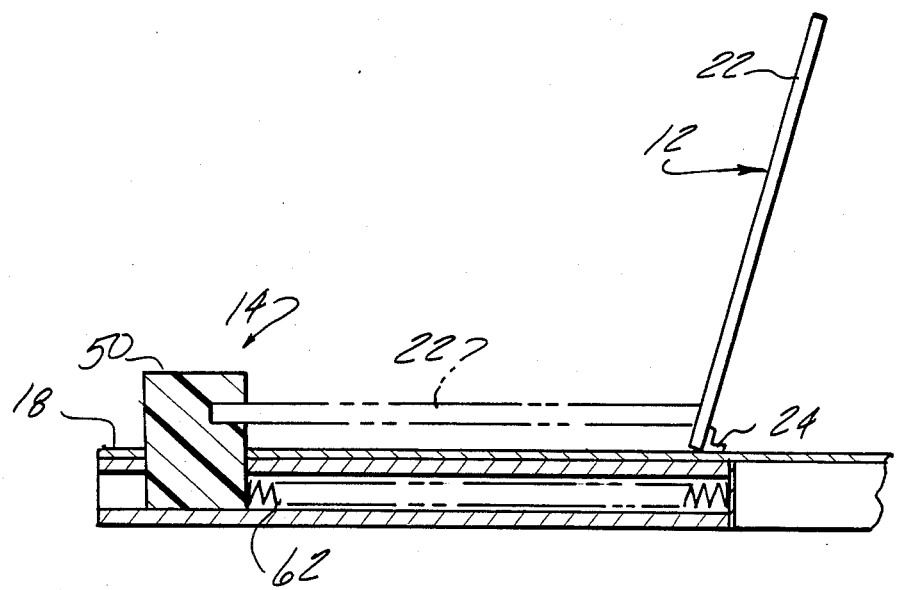
FIG. 3 is a cross-sectional view generally taken along line 3—3 in FIG. 1 and showing the operation of the latch apparatus with a fold down rear window.
Figure 4:
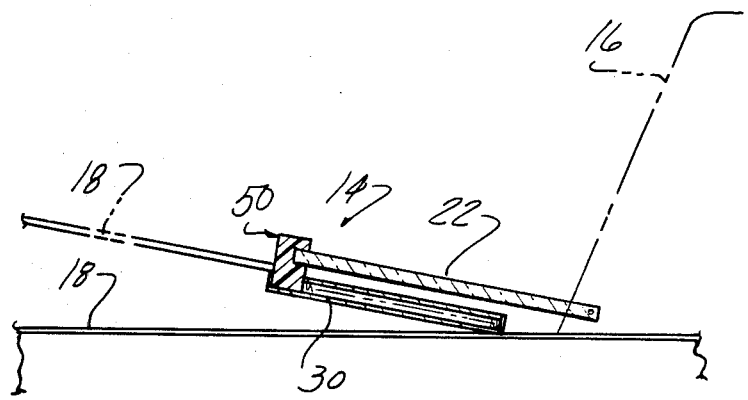
FIG. 4 is a view similar to FIG. 3 but showing the latch apparatus and the fold down rear window at a raised, pivoted position as would occur if the rear deck lid of the vehicle is raised when the window is latched in the fold position.

In operation, as shown in FIGS. 3 and 4, the rear window 12 may be lowered to the folded down position shown in phantom in FIG. 3 once the latch member 50 has been urged manually rearward thereby providing space for lowering of the window 22 to the position shown in FIG. 3. Release of the latch member 50 from the retracted position will cause one edge of the window 22 to engage the slot 60 in the latch member 50 which, in conjunction with the biasing means 62, will hold the latch member 50 securely against the rear window 12 to hold the rear window 22 in the folded down position.

Movement of the latch member 50 to the left, or rear of the vehicle as viewed in the orientation depicted in FIG. 3 will enable the rear window 12 to be pivoted upward about its lower edge 26 to its normally closed position sealing the rear window 17.

While the window 12 is secured by the latch member 50 in the folded down position shown in FIG. 3, it is possible to raise the rear deck lid 18 of the vehicle to provide access to the interior of the rear compartment of the vehicle 10. During such upward movement of the rear deck lid 18, due to the different pivot points of the rear window 12 and the rear deck lid 18, such components pivot about different axis. However, the biasing means 62 enables the latch member 50 to move rearward within the channel member 30 during such pivoting movement of the rear deck lid 18 and the rear window 12 as shown in FIG. 4 so as to prevent breakage of the rear window 12.

Thus, the latch apparatus of the present invention provides two functions: first, the latch apparatus securely retains the rear window of the vehicle in a folded down position during operation of the vehicle and, second, it provides a means for permitting pivotal movement of the rear window when in the folded down, latched position when the rear deck lid of the vehicle is raised thereby preventing damage to the rear window during such upward pivotal movement of the rear deck lid. This enables a fold down rear window to be mounted in a vehicle and located in any operative position without the possibility of damage occuring to the rear window, despite its position.

What is claimed is:

1. A latch apparatus for a vehicle having a rear window pivotally mounted at a bottom edge to the vehicle and movable between a raised position and a folded down position overlying the rear deck lid of the vehicle comprising:
    a channel member mounted on the vehicle rearward of the rear window of the vehicle longitudinally with respect to the vehicle;
    latch means, slidably mounted on the channel member for releasably engaging one edge of the rear window when the window is in the folded down position; and
    means, mounted within the channel member for biasing the latch means toward the front of the vehicle.

2. The latch apparatus of claim 1 wherein the latch means comprises:
    a body having a base portion and an upper portion;
    the base portion being slidably mounted within the channel memeber; and
    a slot formed in the upper portion of the body for releasably engaging an edge of the rear window of the vehicle.

3. The latch apparatus of claim 1 wherein the biasing means comprises a coiled spring mounted within the channel member and connected to the channel member and the body.

4. A latch apparatus for a vehicle having a rear deck lid and a rear window pivotally mounted at a bottom edge to the vehicle and movable between a raised position and a folded down position overlying the rear deck lid of the vehicle comprising:
    a channel member having an interior slot mounted on the vehicle rearward of the rear window of the vehicle longitudinally with respect to the vehicle;
    a latch member slidably mounted within the slot in the channel member;
    the latch member slidably mounted within the slot in the channel member;
    the latch member being in the form of a body having a base portion and an upper portion, the base portion being slidably mounted wtihin the slot in the channel member, the upper portion extending outward from the slot in the channel member;
    a slot formed in the upper portion of the body for releasably receiving an edge of the rear window of the vehicle when the rear window is pivoted downward to the fold-down position; and
    biasing means, mounted in the channel member, for biasing the body to the forward end of the vehicle to retain the rear window in the fold-down position and enable the rear window to pivot upward about its lower edge when retained in the body and the rear deck lid of the vehicle is pivoted upward.

5. A vehicle having a rear window opening comprising:
    a rear window panel for closing the rear window opening, the rear window panel having upper and lower edges;
    means for pivotally mounted the rear window panel at a bottom edge on the vehicle for pivotal movement between a raised position closing the rear window opening and a folded down position opening the rear window opening;

an elongated channel member mounted on the vehicle rearward of the rear window longitudinally with respect to the vehicle, the channel member having an internal slot opening outward from the channel member;

latch means slidably mounted in the slot in the channel member, for releasably engaging the upper edge of the rear window and latching the rear window in the fold-down position; and means, mounted in the channel member, for biasing the latch means toward to forward end of the vehicle.

6. The vehicle of claim 5 wherein the latch means comprises:
a body having a base portion and an upper portion;
the base portion being slidably mounted within the channel memeber; and
a slot formed in the upper portion of the body for releasably engaging an edge of the rear window of the vehicle.

7. The vehicle of claim 6 wherein the biasing means comprises a coil spring mounted within the slot in the channel member.

* * * * *